(12) United States Patent
Stabel

(10) Patent No.: US 11,796,015 B1
(45) Date of Patent: Oct. 24, 2023

(54) DISENGAGEABLE ONE-WAY DIRECTIONAL SPRAG CLUTCH

(71) Applicant: GM GLOBAL TECHNOLOGY OPERATIONS LLC, Detroit, MI (US)

(72) Inventor: Gerald R. Stabel, Zeeland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/709,633

(22) Filed: Mar. 31, 2022

(51) Int. Cl.
| F16D 41/07 | (2006.01) |
| F16D 41/08 | (2006.01) |
| F16D 41/06 | (2006.01) |
| F16D 23/12 | (2006.01) |

(52) U.S. Cl.
CPC .......... F16D 41/07 (2013.01); F16D 41/084 (2013.01); *F16D 2023/123* (2013.01); *F16D 2041/0603* (2013.01)

(58) Field of Classification Search
CPC ........ F16D 41/07; F16D 41/084; F16D 41/14; F16D 41/16; F16D 2041/0603; F16D 2023/123
See application file for complete search history.

(56) References Cited

U.S. PATENT DOCUMENTS

| 1,434,970 | A | * | 11/1922 | Taylor | F16D 15/00 192/93 C |
| 2,955,573 | A | * | 10/1960 | Feucht | B25D 9/08 173/59 |
| 5,971,122 | A | * | 10/1999 | Costin | F16D 41/12 192/103 B |
| 6,125,979 | A | * | 10/2000 | Costin | F16D 41/14 192/103 B |
| 10,145,428 | B2 | * | 12/2018 | Pawley | F16D 41/125 |
| 11,067,137 | B2 | * | 7/2021 | Kato | F16D 41/125 |
| 2017/0138416 | A1 | * | 5/2017 | Lee | F16D 23/14 |
| 2017/0227072 | A1 | * | 8/2017 | Pawley | F16D 41/12 |
| 2019/0101171 | A1 | * | 4/2019 | Kato | F16D 41/14 |

* cited by examiner

*Primary Examiner* — David R Morris

(57) ABSTRACT

A drive system includes an inner race member and an outer race member. A first disengageable sprag clutch is disposed between the inner race member and the outer race member, the first disengageable sprag clutch having a drive direction and a freewheeling direction. A second disengageable sprag clutch is disposed between the inner race member and the outer race member, the second disengageable sprag clutch having a drive direction and a freewheeling direction that are opposite the drive direction and the freewheeling direction of the first disengageable sprag clutch.

14 Claims, 5 Drawing Sheets

DISENGAGEABLE ONE-WAY DIRECTIONAL SPRAG CLUTCH

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a disengageable one-way sprag clutch and to a dual sprag clutch system with two disengageable one-way sprag clutches designed to deliver torque in opposite rotational directions or to simply change the relative angular position of the inner race relative to the outer race.

A sprag clutch is a free-wheel drive device having an inner race, and an outer race either of which can be the input or output member. The input member can be arranged to drive the output member in a chosen direction and permit the output member to over-run in an opposite direction. Sprag clutches are able to transmit large torques, within small overall dimensions.

A sprag clutch includes an array of shaped steel sprags that are located in an annular space between the concentric inner and outer races. Power is transmitted from one race to the other by a wedging action of the sprags between the one race and the other. Each sprag is so shaped that rotation of one race in the 'driving' direction causes the sprags to tilt, thus transmitting the torque in full from one race to the other. Conversely, rotation of the race in the other direction frees the sprags and permits over-running between the races.

SUMMARY

A drive system includes an inner race member and an outer race member. A first disengageable sprag clutch is disposed between the inner race member and the outer race member, the first disengageable sprag clutch having a drive direction and a freewheeling direction. A second disengageable sprag clutch is disposed between the inner race member and the outer race member, the second disengageable sprag clutch having a drive direction and a freewheeling direction that are opposite the drive direction and the freewheeling direction of the first disengageable sprag clutch.

According to a further aspect of the present disclosure, a sprag clutch includes an inner race member; an outer race member; a plurality of sprags supported between the inner race member and the outer race member, each of the sprags having a support region and a wedge surface, wherein a recess is provided in the wedge surface. An expandable ring is received in the recess of each of the plurality of sprags.

According to a further aspect, a sprag for use in a sprag clutch includes a metallic body having a support region with a pair of recesses in each end that each define a support ledge. The metallic body further includes a wedge surface with a recess provided in the wedge surface.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
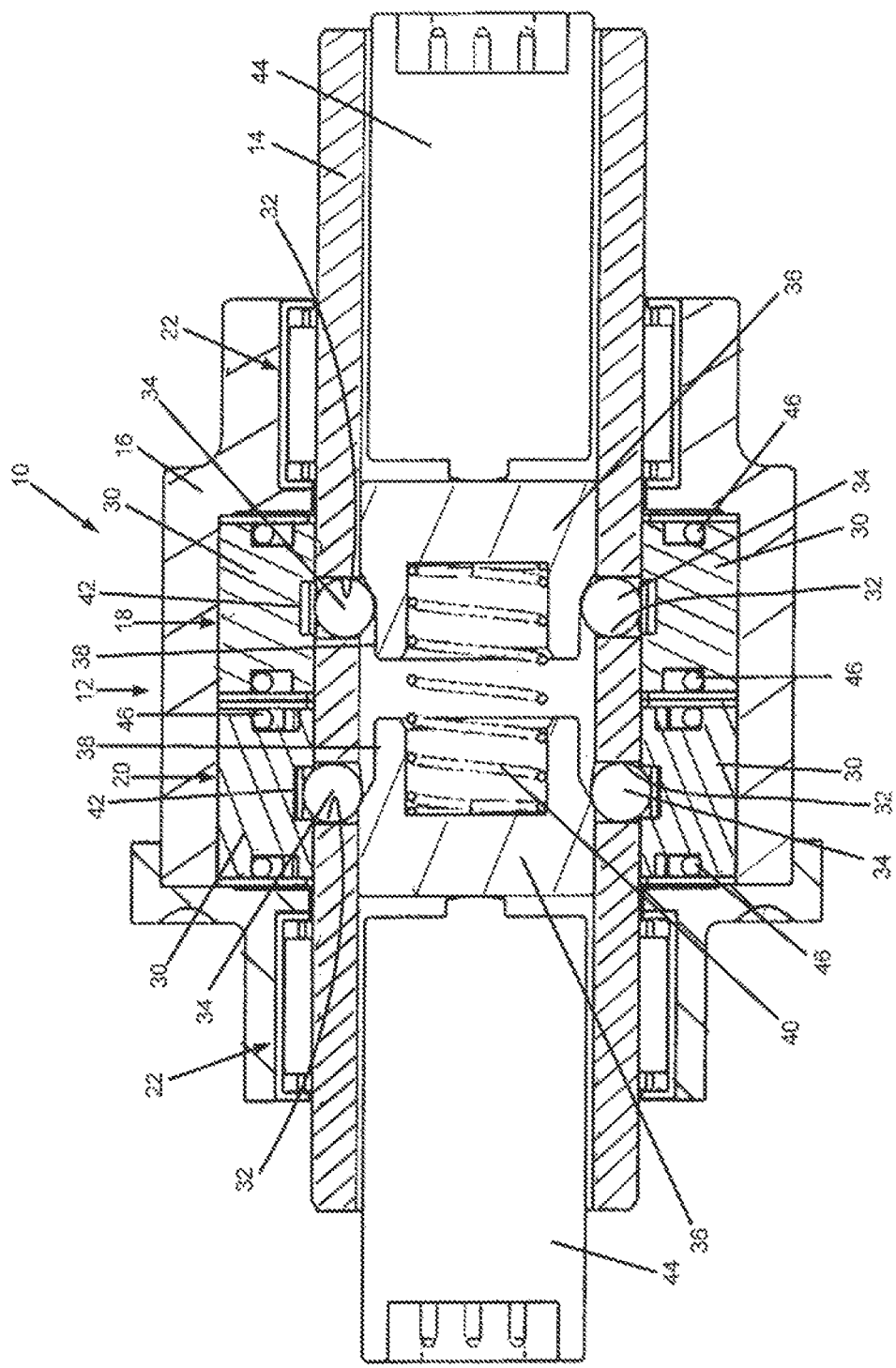
FIG. 1 is a longitudinal cross sectional view of a dual sprag clutch system for a shaft.

With reference to FIG. 1, a longitudinal cross-sectional view of an example torque transmission system 10 with a dual sprag clutch system 12 will now be described. The torque transmission system 10 include an inner race member 14 and an outer race member 16. The inner race member 14 and the outer race member 16 can be separate drive or driven members of drive system. The inner race member 14 and the outer race member 16 are drivingly engageable with each other by a pair of oppositely oriented, disengageable sprag clutches 18, 20. The outer race member 16 can be rotatably supported on the inner race member 14 by a pair of bearings 22.

Figure 2:
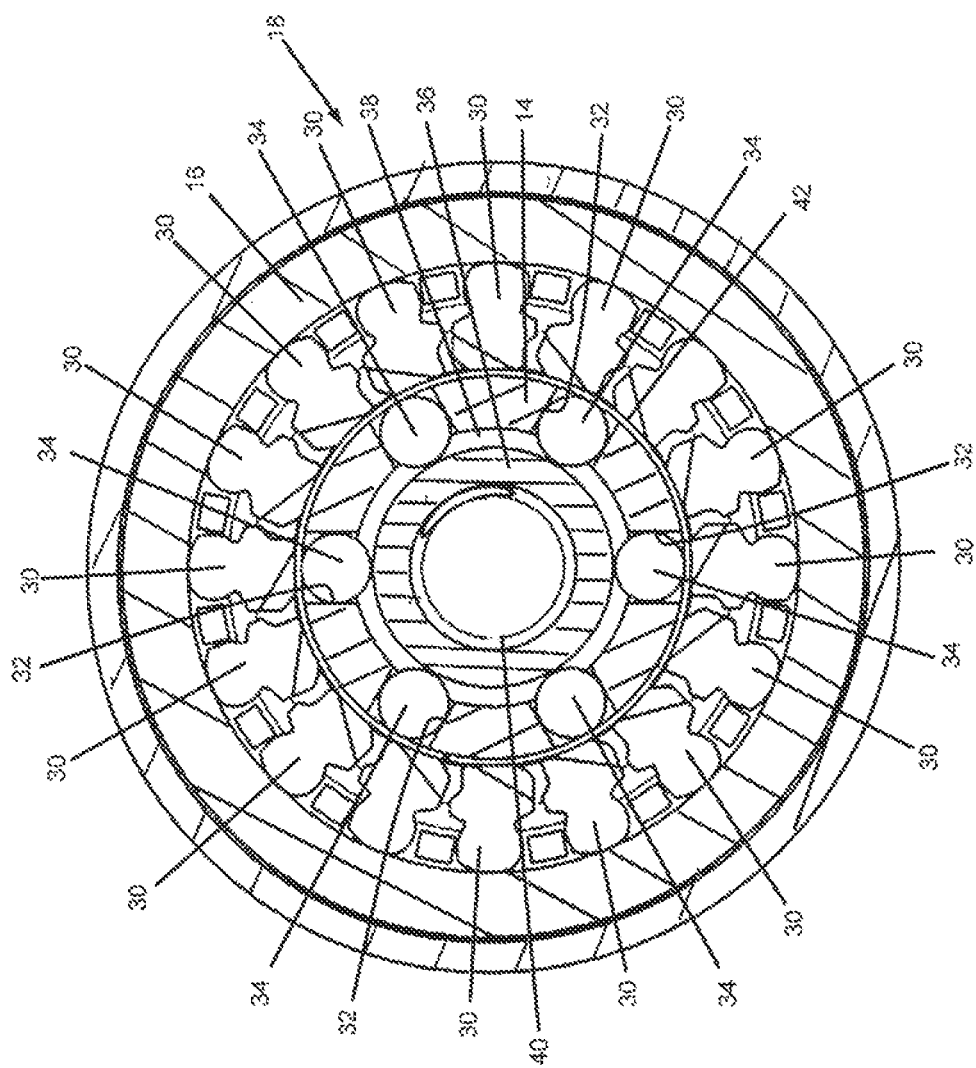
FIG. 2 is a cross-sectional view of a first sprag clutch assembly of the dual sprag clutch system according to the principles of the present disclosure.

With reference to FIG. 2, the first sprag clutch 18 is arranged to transmit torque from the inner race member 14 to the outer race member 16 when the inner race member 14, for example, is rotated in a counter-clockwise direction, as illustrated in FIG. 2. Conversely, when the inner race member 14 is rotated in a clockwise direction, the first sprag clutch 18 is arranged to not transmit toque to the outer race member 16 so that the first sprag clutch is freewheeling.

In particular, the first sprag clutch 18 includes an array of wedge-shaped steel sprags 30 that are located in an annular space between the inner race member 14 and the outer race member 16. Power is transmitted from one of the inner and outer race members 14, 16 to the other by a wedging action of the sprags 30 between the one of the inner and outer race members 14, 16 and the other. Each sprag 30 is so shaped that rotation of one of the inner and outer race members 14, 16 in a "driving" direction causes the sprags 30 to tilt to a wedged position, thus transmitting the torque in full from one race to the other. Conversely, rotation of the one of the inner and outer races 14, 16 in the other direction frees the sprags and permits over-running between the inner and outer races 14, 16.

Figure 3:
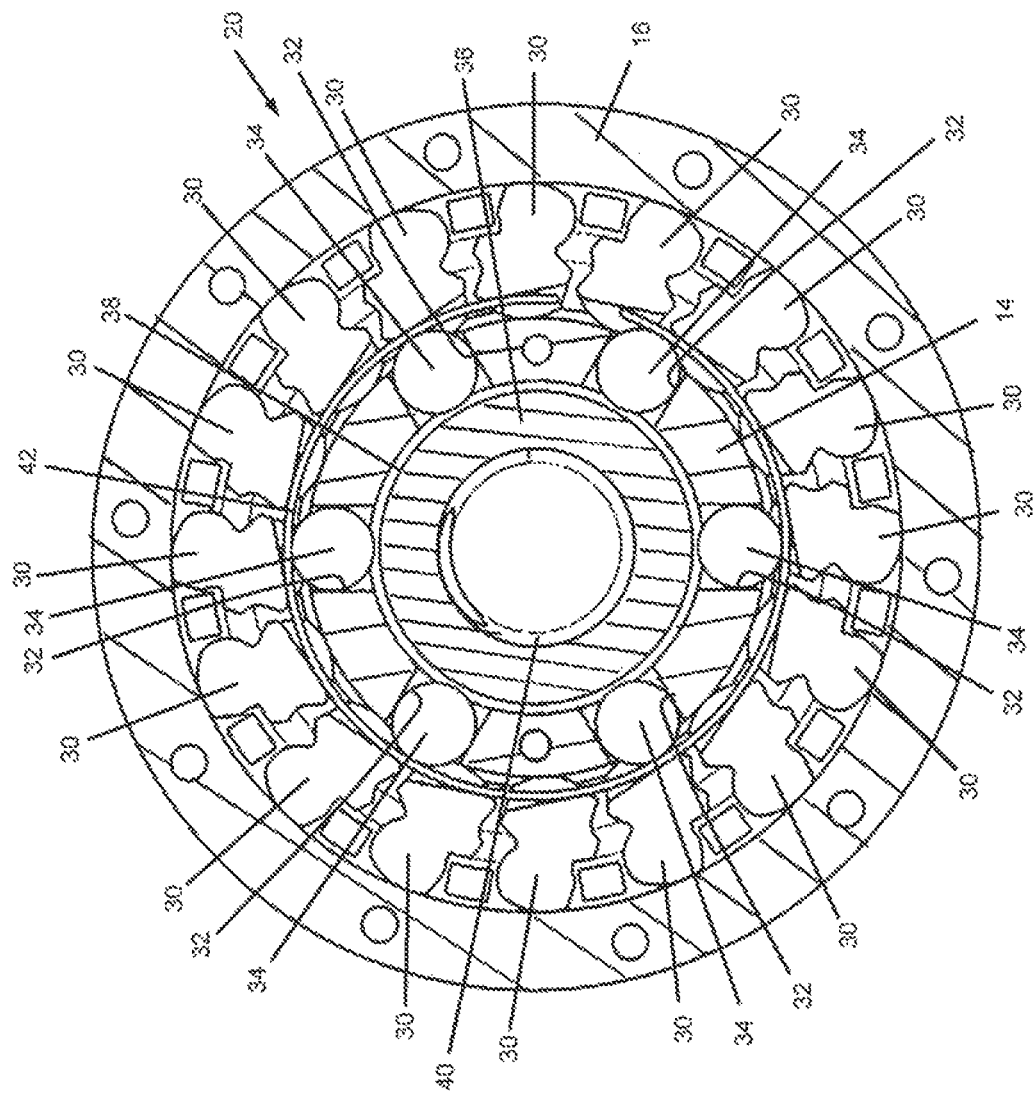
FIG. 3 is a cross-section view of a second sprag clutch assembly of the dual sprag clutch system according to the principles of the present disclosure.

The second sprag clutch 20 is oppositely arranged to the first sprag clutch 18 so that when the inner race member 14 is rotated in a counter-clockwise direction, as viewed in FIG. 3, the second sprag clutch 20 is arranged to not transmit torque to the outer race member 16 so that the second sprag clutch is freewheeling. Conversely, when the inner race member 14 is rotated in a clockwise direction, the second sprag clutch 20 is arranged to transmit toque to the outer race member.

The same as the first sprag clutch 18, the second sprag clutch 20 includes an array of wedge-shaped steel sprags 30 that are located in an annular space between the inner race member 14 and the outer race member 16. It should be understood that the first sprag clutch 18 and the second sprag clutch 20 can have the same or different designs. Power is transmitted from one of the inner and outer race members 14, 16 to the other by a wedging action of the sprags 30 between the one of the inner and outer race members 14, 16 and the other. Each sprag 30 is so shaped that rotation of one of the inner and outer race members 14, 16 in a "driving" direction, which is an opposite rotational direction to the driving direction of the first sprag clutch 18, causes the sprags 30 to tilt to a wedged position, thus transmitting the torque in full from one race to the other. Conversely, rotation of the one of the inner and outer races 14, 16 in the other direction frees the sprags 30 and permits over-running between the inner and outer races 14, 16.

Figure 4:
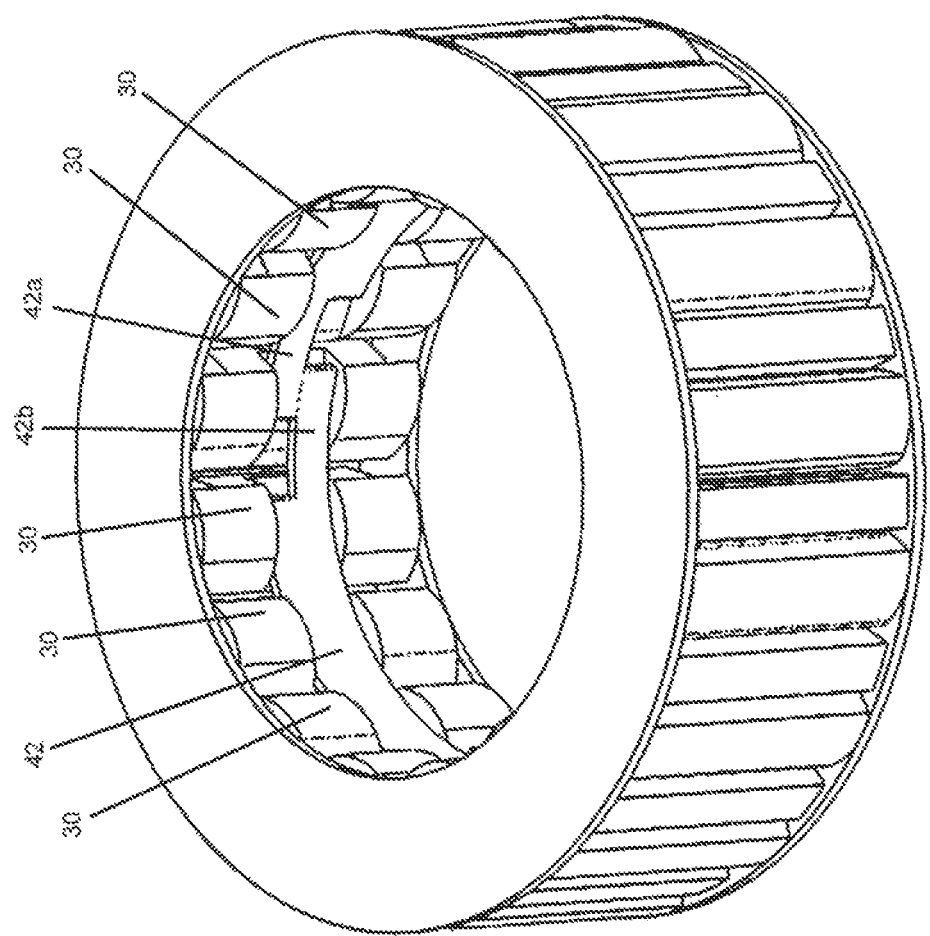
FIG. 4 is a perspective view of an example sprag clutch assembly according to the principles of the present disclosure.

The operation of the first and second sprag clutches 18, 20 in the driving condition and the freewheeling condition is typical of a sprag clutch. However, the first and second sprag clutches 18, 20 include a disengagement mechanism that is capable of disengaging the clutch so that they are prevented from transmitting torque from one race to the other even when they are rotated in the "driving" direction. In particular, each of the first and second sprag clutches 18, 20 include a plurality of window openings 32 in the hollow tubular inner race member 14. A plurality of balls 34 are disposed in a respective one of the plurality of window openings 32. The plurality of balls 34 are supported within the windows on an interior side by a plunger 36 having a cam surface 38 that engages the plurality of balls 34. The plunger 36 is biased in a first axial direction by a spring 40 that extends between the plunger 36 of each of the first and second sprag clutches 18, 20, Alternative designs can be used with an actuator moving the plunger both into and out of the engagement position. In addition, the plunger 36 of each of the first and second sprag clutches 18, 20 can be interconnected to move simultaneously with one another. The plurality of balls 34 are all disposed against an inner surface of an expandable split ring 42 that surrounds the inner race member 14. The expandable split ring 42 can be made from spring steel and can include overlapping split ends 42a, 42b, as shown in FIG. 4. The plunger 36 can be pressed axially to cause the balls to ride along the cam surface and radially outward relative to the window openings and against the expandable split ring 42. Thus, the expandable split ring 42 is expandable in a radially outward direction to engage the sprags 30 and support the sprags 30 in a disengaged position creating clearance between the sprags 30 and inner race member 14. Thus, the outer race member 16 is free to rotate in the driving or free-wheeling direction without the sprags 30 engaging. The plungers 36 can be pressed against the bias force of the spring 40 to disengage the corresponding clutch by an actuator 44 that can include an electro-magnetic actuator, pneumatic actuator, hydraulic actuator, mechanical actuator or other know type of actuator.

Figure 5:
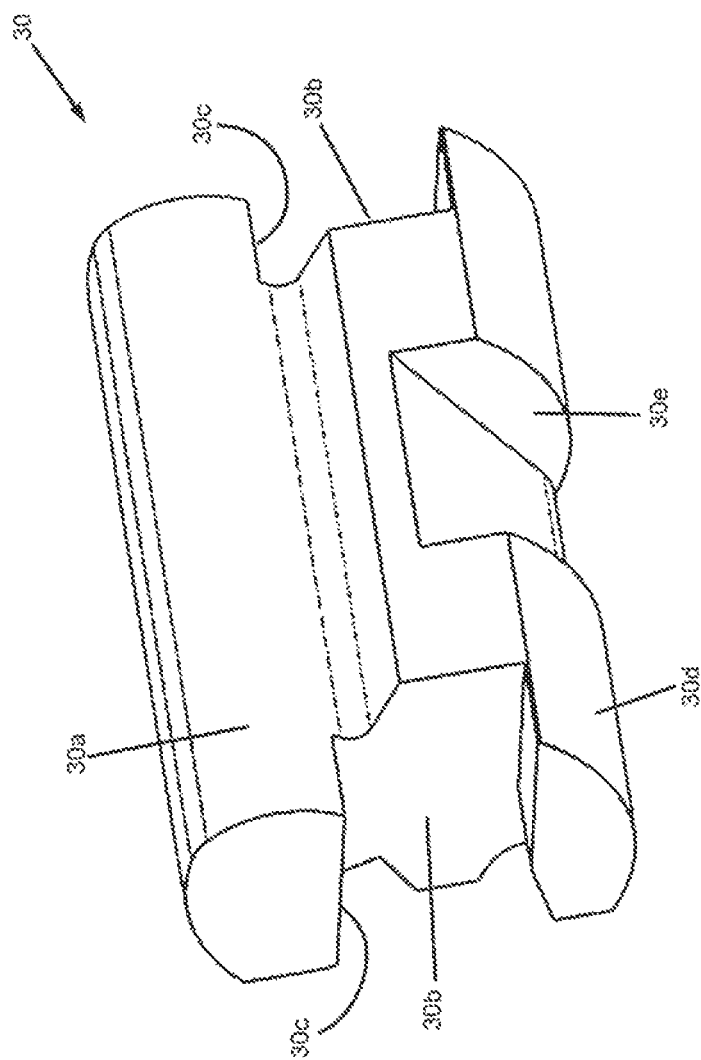
FIG. 5 is a perspective view of an example sprag clutch member according to the principles of the present disclosure.

With reference to FIG. 5, the sprags 30 include a radially outer support region 30a with a pair of end recesses 30b that define a ledge 30c that is disposed against an energizer ring 46, as shown in FIG. 1. The energizer ring 46 can bias the sprags toward the engaged position. It should be understood that the energizer ring can take on alternative forms and engage the sprags in different ways. The sprags 30 further include an inner wedge surface 30d that engages the inner race member 14. A recess 30e is provided in the wedge surface 30d for receiving the expandable ring 42 therein.

The first and second one-way sprag clutches 18, 20 opposite each other can be mounted to the same rotating race members 14, 16 and the race members 14, 16 can be rotated relative to one another in either direction if the corresponding one of the clutches 18,20 is disengaged as described above.

This disengageable clutches 14, 16 can retain disengagement of the sprags 30 in an otherwise standard one-way directional sprag clutch by applying inside or outside force to all of the arrayed sprags 30 of the clutch. Where it was before strictly one-directional, now the clutch can be turned in the opposite direction without the sprags re-engaging (locking) as they normally would without the inside or outside force.

By assembling two sprag clutches on the same drive shaft, one mounted to operate in one direction and the other clutch to operate in the opposite direction, a locked drive system is created since both clutches negate the other's motion. To start motion in either direction, the opposite clutch can be disengaged as described above to allow the shaft to turn in that direction. The clutches can be switched to allow the shaft or drive member to turn in the opposite direction. Both clutches can also be engaged for allowing a shaft to rotate freely in either direction.

The main benefits would be the small assembly size, extreme robustness and durability (using proven, decades old technology), simplicity and low parts count (as compared to a transmission or rear diff.), instantaneous lock-up and low noise.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A drive system, comprising:
   an inner race member;
   an outer race member;
   a first disengageable sprag clutch disposed between the inner race member and the outer race member, the first disengageable sprag clutch having a drive direction and a freewheeling direction; and
   a second disengageable sprag clutch disposed between the inner race member and the outer race member, the second disengageable sprag clutch having a drive direction and a freewheeling direction that are opposite the drive direction and the freewheeling direction of the first disengageable sprag clutch, wherein the first disengageable sprag clutch and the second disengageable sprag clutch each include a disengagement mechanism for preventing the first and second disengageable sprag clutches from being engaged in a driving direction, wherein the disengagement mechanism includes an expandable ring that engages sprags of the respective first disengageable sprag clutch and the second disengageable sprag clutch and when expanded prevents the sprags from engaging the inner race member.

2. The drive system according to claim 1, wherein the disengagement mechanism includes a plunger disposed in a hollow cavity of the inner race member and having a cam surface that engages a plurality of balls engaged that are disposed within respective window openings in the inner race member and engageable with the expandable ring, wherein movement of the plunger within the inner race member causes the balls to extend radially outward from the window opening and expand the expandable ring to disengage the sprags from the inner race.

3. The drive system according to claim 2, wherein the plunger is actuated by one of a hydraulic, pneumatic, electro-magnetic and a mechanical actuator.

4. The drive system according to claim 1, wherein the sprags are supported at opposites ends by a pair of energizer rings of each of the first and second disengageable sprag clutches.

5. A drive system, comprising:
   an inner race member;
   an outer race member;
   a first disengageable sprag clutch disposed between the inner race member and the outer race member, the first disengageable sprag clutch having a drive direction and a freewheeling direction; and
   a second disengageable sprag clutch disposed between the inner race member and the outer race member, the second disengageable sprag clutch having a drive direction and a freewheeling direction that are opposite the drive direction and the freewheeling direction of the first disengageable sprag clutch, wherein the first disengageable sprag clutch and the second disengageable sprag clutch each include a plurality of sprags having a wedge surface for engaging the inner race member and the plurality of sprags each include a recess within the wedge surface, wherein an expandable ring is received in the recess of each of the sprags.

6. The drive system according to claim 5, wherein the recess is substantially centered within the wedge surface.

7. A sprag clutch, comprising:
   an inner race member;
   an outer race member;
   a plurality of sprags supported between the inner race member and the outer race member, each of the sprags having a support region and a wedge surface, wherein a recess is provided in the wedge surface;
   a ring received in the recess of each of the plurality of sprags; and
   a disengagement mechanism for preventing the plurality of sprags from being engaged in a driving direction.

8. The sprag clutch according to claim 7, wherein the ring is made of spring steel.

9. The sprag clutch according to claim 7, wherein the ring is a split ring.

10. The sprag clutch according to claim 7, wherein the disengagement mechanism expands the ring to prevent the sprags from engaging the inner race member.

11. The sprag clutch according to claim 10, wherein the disengagement mechanism includes a plunger disposed in a hollow cavity of the inner race member and having a cam surface that engages a plurality of balls that are disposed within respective window openings in the inner race member and engageable with the ring, wherein movement of the plunger within the inner race member causes the balls to extend radially outward from the window openings and expand the expandable ring to disengage the sprags from the inner race.

12. The sprag clutch according to claim 11, wherein the plunger is actuated by one of a hydraulic, pneumatic, electro-magnetic and a mechanical actuator.

13. The sprag clutch according to claim 7, wherein the plurality of sprags are supported at opposites ends by a pair of energizer rings.

14. The sprag clutch according to claim 7, wherein the recess is substantially centered within the wedge surface.

* * * * *